US008881116B2

(12) United States Patent
Mulat

(10) Patent No.: US 8,881,116 B2
(45) Date of Patent: Nov. 4, 2014

(54) IDENTIFYING AND TRIAGING SOFTWARE BUGS THROUGH BACKWARD PROPAGATION OF UNDER-APPROXIMATED VALUES AND EMPIRIC TECHNIQUES

(75) Inventor: Gael Mulat, La Rochette (FR)

(73) Assignee: The MathWorks, Inc., Natick, MA (US)

( * ) Notice: Subject to any disclaimer, the term of this patent is extended or adjusted under 35 U.S.C. 154(b) by 478 days.

(21) Appl. No.: 13/258,234

(22) PCT Filed: Jun. 8, 2011

(86) PCT No.: PCT/IB2011/002015
§ 371 (c)(1),
(2), (4) Date: Sep. 21, 2011

(87) PCT Pub. No.: WO2012/168755
PCT Pub. Date: Dec. 13, 2012

(65) Prior Publication Data
US 2012/0317554 A1 Dec. 13, 2012

(51) Int. Cl.
*G06F 9/44* (2006.01)
*G06F 11/36* (2006.01)
(52) U.S. Cl.
CPC .................... *G06F 11/3608* (2013.01)
USPC ............... 717/131; 717/126; 717/133
(58) Field of Classification Search
CPC .................................... G06F 11/3466
USPC .................................. 717/124–167
See application file for complete search history.

(56) References Cited

U.S. PATENT DOCUMENTS

| 7,900,193 B1* | 3/2011 | Kolawa et al. | 717/126 |
| 2003/0126590 A1* | 7/2003 | Burrows et al. | 717/154 |
| 2009/0044177 A1* | 2/2009 | Bates et al. | 717/131 |
| 2009/0210854 A1* | 8/2009 | Carteri et al. | 717/102 |
| 2012/0297372 A1* | 11/2012 | Berg et al. | 717/131 |

OTHER PUBLICATIONS

Huang, Yao-Wen, et al. "Securing web application code by static analysis and runtime protection." Proceedings of the 13th international conference on World Wide Web, ACM, 2004, pp. 40-52.*

(Continued)

*Primary Examiner* — Satish Rampuria
(74) *Attorney, Agent, or Firm* — Harrity & Harrity, LLP

(57) ABSTRACT

A software testing tool may use static verification analysis techniques to locate points (lines/events) in computer code at which an error may be present and points (lines/events) in the computer code that may be the underlying cause of the located error points. In one implementation, a device may perform a static verification analysis of computer code to locate a point in the code that causes an error in the execution of the computer code. The static analysis may be performed by analyzing a first set of possible execution paths of the computer code based on an over-approximation of states. The device may back-propagate, from the located point, through a second set of possible execution paths, where the second set of possible execution paths is obtained based on an under-approximation of the states that were over-approximated. Based on the back-propagation, the device may determine potential causes of the error. Additionally, in some implementations, empiric analysis techniques, based on semantic information for the computer code, may also be performed. The empiric analysis techniques may be used to assist in classifying the potential causes of the error.

26 Claims, 12 Drawing Sheets

(56) References Cited

OTHER PUBLICATIONS

Ball, Thomas, and Sriram K. Rajamani. "The S LAM project: debugging system software via static analysis." ACM SIGPLAN Notices. vol. 37. No. 1. ACM, 2002, pp. 1-3.*

Ernst, Michael D. "Static and dynamic analysis: Synergy and duality." WODA 2003: ICSE Workshop on Dynamic Analysis. 2003, pp. 24-27.*

Bourdoncle, "Abstract debugging of higher-order imperative languages", ACM, 1993, pp. 46-55.*

Detlefs, David L., et al. "Extended static checking." Compaq Systems Research Center (1998), http://www.research.digital.com/SRC/, pp. 1-44.*

Bourdoncle, François. "Assertion-based debugging of imperative programs by abstract interpretation." Software Engineering—ESEC'93. Springer Berlin Heidelberg, 1993. pp. 501-516.*

Comini, Marco, et al. "Abstract interpretation based verification of logic programs." Electronic Notes in Theoretical Computer Science 30.1 (1999): pp. 22-38.*

Notification of Transmittal of the International Search Report and the Written Opinion of the International Searching Authority, or the Declaration corresponding to PCT/IB2011/002015 mailed Nov. 29, 2011, 9 pages.

Grasso et al., "Model Based Testing and Abstract Interpretation on the Railway Signaling Context", IEEE 2010 Third International Conference, Apr. 6, 2010, pp. 103-106, XP031684038.

Deutsch, "Static Verification of Dynamic Properties", Nov. 27, 2003, 8 pages, XP031684038.

* cited by examiner

```
1   #define MAX_ARR 5
2   int array[MAX_ARR] = {300, 900, 1500, 4000};
3
4   unsigned int get_index(int count)
5   {
6       int i = 0;
7       unsigned int arr_size = sizeof(array)/sizeof(int);
8       for ( i = 0; i < arr_size; i++ ) {
9           if ( count < array[i] ) return i;
10      }
11      return i; // here, the value is always 5  (due to the loop)
12  }
13
14  int array2[MAX_ARR] = {1, 2, 3, 4, 5};
15
16  int f(int count) {
17      int index;
18
19      index = get_index(count);
20      return array2[index]; // when the value is 5, there is an Array Out of Bounds
21  }
```

930 — POSSIBLE CAUSE OF ERROR AT LINE 24.

920 — POSSIBLE ARRAY OUT-OF-BOUNDS ERROR.

FIG. 9

IDENTIFYING AND TRIAGING SOFTWARE BUGS THROUGH BACKWARD PROPAGATION OF UNDER-APPROXIMATED VALUES AND EMPIRIC TECHNIQUES

BACKGROUND

Software products can potentially be very large and complex. Software testing is the process used to measure the quality of developed computer software. Quality may be judged based on a number of metrics, such as correctness, completeness, reliability, number of bugs found, efficiency, and compatibility.

The amount of testing required for a particular software project frequently depends on the target for the deployed software. A developer of game software intended for personal computers, for example, may devote relatively little resources into formal testing of the software. In contrast, the developer of a mission critical application in the healthcare, automotive, or utility industry may require a much more rigorous level of software testing.

One technique for testing software is based on the concept of static verification of the software code. In general, static code verification is an analysis performed without executing the software. Static verification of software code can prove, for example, which operations are free of run-time errors, such as numeric overflows, divisions by zero, buffer overflows, or pointer issues, and identify where run-time errors will or might occur.

In one existing system, static verification is used to classify the code into categories. The categories may include code determined to be good, safe or correct, code determined to have errors, code determined not to be accessible (e.g., dead code or deactivated code), and code for which an error may be present but for which the error could not be conclusively determined ("possible error" code). Code classified as "possible error" represents code that the static verification system could not conclusively determine as including an error. A developer faced with a "possible error" code point may be required to manually review the code to determine if the code will actually cause an error and, if so, to determine what section of the code is the underlying cause of the error.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 9 is a diagram illustrating an example of a graphical interface in which computer code is shown that may be analyzed by the software verification tool;

DETAILED DESCRIPTION

The following detailed description refers to the accompanying drawings. The same reference numbers in different drawings may identify the same or similar elements. Also, the following detailed description does not limit the invention.

Implementations described herein relate to an automated software testing tool in which static verification analysis techniques are used to locate a point in computer code at which an error may be present. The software testing tool may then step backwards through the computer code (called back-propagation herein) from the located point based on an under-approximation of co-accessible states corresponding to the located point. Based on the back-propagation, one or more second points in the computer code may be identified as points in the computer code that are likely to be the cause of the error. The second points (e.g., the likely causes of the error) may be output to the user.

Static verification analysis or static analysis techniques, as the phrases are used herein, may generally refer to an analysis of computer code for errors or inconsistencies that is performed without executing the code. For example, static analysis may examine code using abstract interpretation techniques to verify possible executions of software.

Dynamic verification analysis or dynamic analysis techniques, as the phrases are used herein, may refer to verification of software performed by or during the execution of the software. Dynamic verification may involve, for example, executing the software with a set of test input values.

System Description

Figure 1:
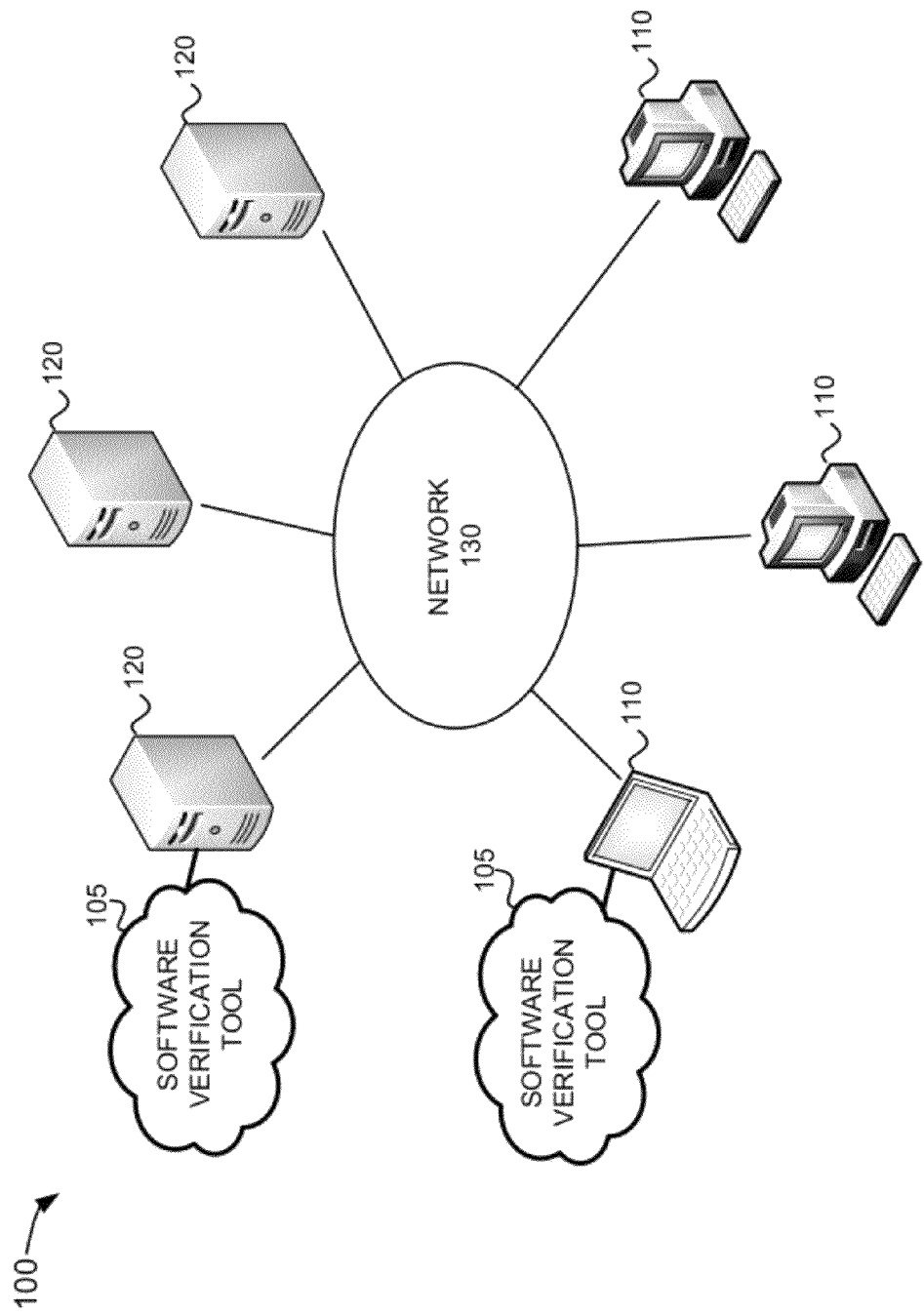
FIG. 1 is a diagram of an example system in which concepts described herein may be implemented.

FIG. 1 is a diagram of an example system 100 in which concepts described herein may be implemented. The system may include one or more workstations 110, one or more servers 120, and a network 130. Consistent with aspects described herein, software verification tool 105 may be executed by one or more of servers 120 and workstations 110 to assist in software verification.

Workstations 110 may generally include any computing device at which software may be developed, such as desktop or laptop computers, tablet computers, smartphones, etc., that may be used for general computing tasks. In general, users of workstations 110 may be software developers. The users may use verification tool 105 to assist in verifying their developed software code. In some implementations, as shown in FIG. 1, verification tool 105 may include client-side components and server-side components. The client-side components may be executed at the user's workstation 110 while the server-side components may execute at one or more of servers 120. In an alternative implementation, and possibly under certain restrictions on use, such as the size of the code to be verified, verification tool 105 may execute exclusively at the user's workstation 110.

In some implementations, workstations 110 may execute a technical computing environment (TCE) that presents a user with an interface that enables efficient analysis and generation of technical applications. For example, the TCE may provide a numerical and/or symbolic computing environment that allows for matrix manipulation, plotting of functions and data, implementation of algorithms, creation of user interfaces, and/or interfacing with programs in other languages.

Servers 120 may each include a device, such as a computer or another type of computation or communication device. Server device 120 may generally provide services to other devices (e.g., workstations 110) connected to network 130. In one embodiment, one or more of server devices 120 may include server components of software verification tool 105.

Network 130 may include any type of network, such as a local area network (LAN), a wide area network (WAN), a telephone network (e.g., the Public Switched Telephone Network (PSTN) or a cellular network), an intranet, the Internet, or a combination of networks.

In some implementations, software verification tool 105 may verify software that is being designed, on workstation 110, for a target machine. The target machine may be a device, such as a cellular phone, medical device, or other device that is to run the software being developed by a developer. In these situations, software verification tool 105 may include options so that, when verifying the software for the target machine, software verification tool 105 can simulate the environment of the target machine. For example, for an embedded system that uses a 16-bit processor, the value of certain variables, such as an integer, may be verified as a 16-bit value, even through the workstation 110 at which the software is being developed may use a 32 or 64 bit machine.

Although FIG. 1 shows example components of system 100, in other implementations, system 100 may contain fewer components, different components, differently arranged components, and/or additional components than those depicted in FIG. 1. Alternatively, or additionally, one or more components of system 100 may perform one or more tasks described as being performed by one or more other components of system 100.

Figure 2:
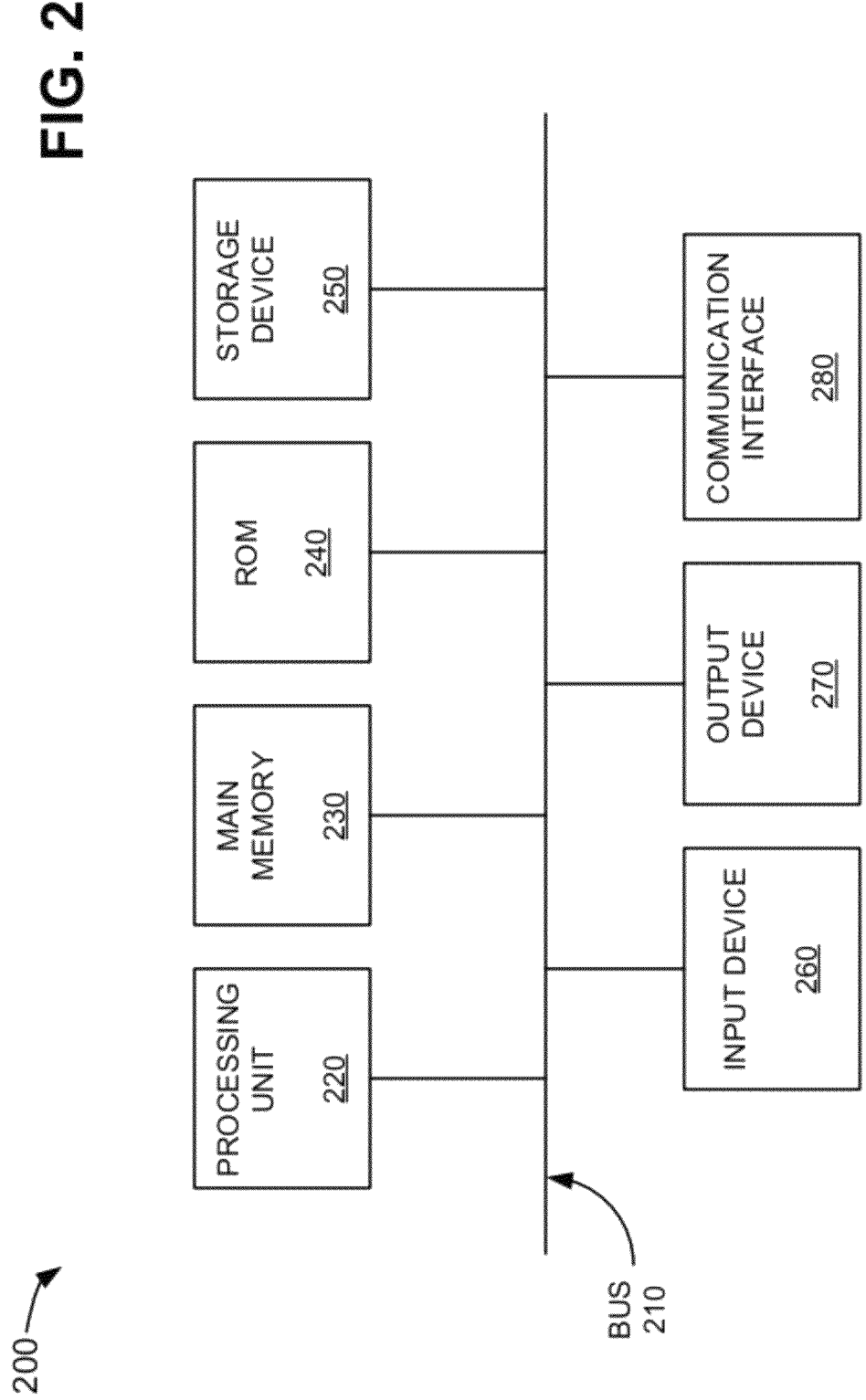
FIG. 2 is a diagram of an example device corresponding to one of the workstations or servers shown in FIG. 1.

FIG. 2 is a diagram of an example device 200, corresponding to one of workstations 110 or servers 120. As illustrated, device 200 may include a bus 210, a processing unit 220, a main memory 230, a read-only memory (ROM) 240, a storage device 250, an input device 260, an output device 270, and/or a communication interface 280. Bus 210 may include a path that permits communication among the components of workstation 110.

Processing unit 220 may include a processor, microprocessor, or other types of processing logic that may interpret and execute instructions. Main memory 230 may include a random access memory (RAM) or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator (e.g., a software developer, a quality engineer, . . . ) to input information to workstation 110, such as a keyboard, a mouse, a pen, a microphone, voice recognition and/or biometric mechanisms, etc. Output device 270 may include a mechanism that outputs information to the operator, including a display, a printer, a speaker, etc. Communication interface 280 may include any transceiver-like mechanism that enables workstation 110 to communicate with other devices and/or systems. For example, communication interface 280 may include mechanisms for communicating with another device or system via a network.

As will be described in detail below, workstation 110 may perform certain operations in response to processing unit 220 executing software instructions contained in a computer-readable medium, such as main memory 230. A computer-readable medium may be defined as a non-transitory memory device. A memory device may include space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, or additional components than depicted in FIG. 2. In still other implementations, one or more components of device 200 may perform one or more tasks described as being performed by one or more other components of device 200.

Software Verification Tool

As previously mentioned, verification tool 105 may be used to measure the quality of developed computer software and assist users in locating errors ("bugs") in the computer software.

In one implementation, verification tool 105 may be used in the context of a technical computing environment. A technical computing environment, as the term is used herein, may be broadly interpreted to include any hardware based logic and/or hardware/software based logic that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Ada, Fortran, Pascal, etc. A technical computing environment may additionally provide mathematical functions and/or graphical tools or blocks (e.g., for creating plots, surfaces, images, volumetric representations, etc.). Verification tool 105 may operate as a component in a technical computing environment to verify code created with the technical computing environment. For example, the technical computing environment may give the user an option to create graphical models. The technical computing environment may then compile the created graphical model for execution on a target system. Verification tool 105 may be used to verify the code that embodies the graphical model.

More generally, although verification tool 105 may be used in the context of a technical computing environment, verification tool 105 may be used with substantially any software development project and/or in any type of computing environment. For example, verification tool 105 can, but is not restricted to, analyze code written in conventional programming language, such as C++, C and Ada, and which is produced manually by a developer with no use of a technical computing environment. In addition, verification tool 105 can be used in standalone environments, distributed environments, heterogeneous computing environments, homogeneous computing environments, etc.

Figure 3:
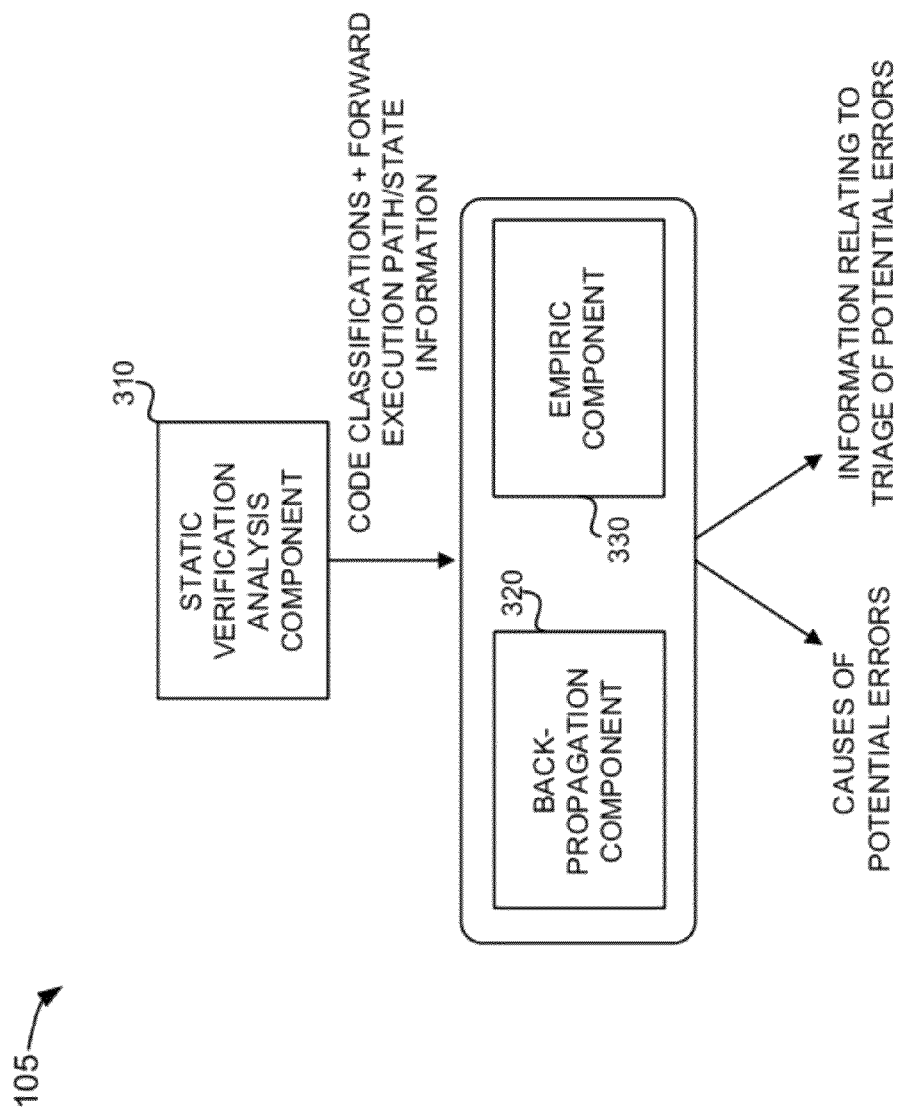
FIG. 3 is a functional diagram illustrating an example of conceptual components of a verification tool.

FIG. 3 is a functional diagram illustrating an example of conceptual components of verification tool 105. Verification tool 105 may include a static verification analysis component 310, back-propagation component 320, and empiric component 330.

Static verification analysis component 310 may include logic to perform a static analysis of input computer code. The static verification may be performed using abstract interpretation. Static verification techniques are generally known and are based on automatically determining properties of some or all possible execution paths, of the input computer code, in some or all possible execution environments. During static verification, static verification analysis component 310 may keep track of a number of states, where each state is defined by an execution point in the computer code and by a set of variable values. In this manner, for a given section of computer code, static verification analysis component 310 may keep track of a number of possible execution paths, where each execution path may be defined by a linked graph of nodes, and where each node may represent a state.

In practice, if the execution path for every possible state were considered, the number of possible execution paths and nodes may quickly become computationally infeasible, as the variables in the computer code can each individually have many different values (e.g., an eight bit character variable may have 256 possible different values). Static verification analysis component 310 may use abstract interpretation to limit the number of execution paths to a computationally manageable set. Abstract interpretation may refer to the approximation of mathematical structures, such as the variables in the computer code, by representing the variable states abstractly. For example, an integer variable may be represented by the sign of the variable (positiveornegative). A number of different abstract interpretation techniques, called lattices or abstract domains, are known and may be used by static verification component 310. For example, variables in the computer code may be approximated using abstract domains, based on the sign of variables, intervals assigned to the variables, linear equalities, difference-bound matrices . . . .

In performing the static verification, static verification analysis component 310 may perform an over-approximation of the possible states. The term over-approximation, as used herein, may refer to an abstract approximation of states in the execution path in which the states are approximated such that all states that may occur during a real execution of the computer code are included. The over-approximated states may additionally include states that may never actually occur during real execution of the computer code. Over-approximation may be useful when testing soundness of computer code, as it may be important to never omit an event, even a rare event, that may occur during real execution of the computer code. For example, an input, such as a value that represents a voltage received from a sensor, may be overestimated as the maximum capacity of a register that receives the voltage input value even if the maximum capacity of the register exceeds the normal range of the sensor.

Figure 4:
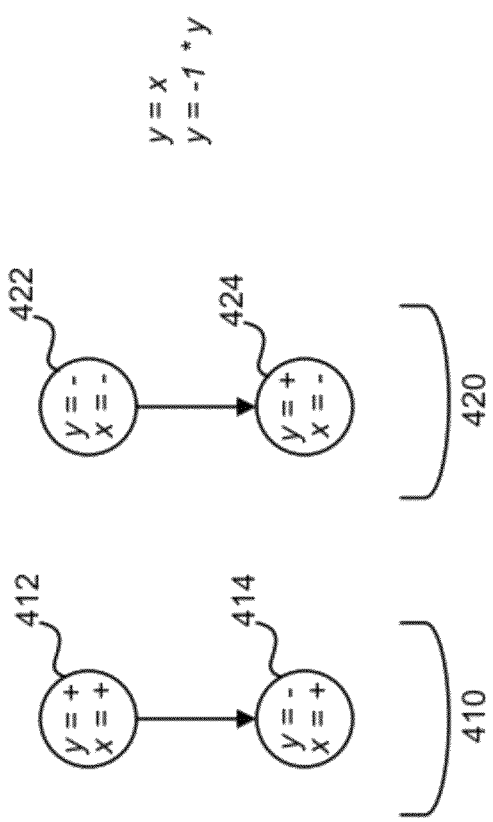
FIG. 4 is a diagram illustrating an example set of execution paths that may be calculated by a static verification analysis component.

FIG. 4 is a diagram illustrating an example set of execution paths that may be calculated by static verification analysis component 310. Two code execution paths, execution paths 410 and 420, are illustrated in FIG. 4. Each node (shown with circles) in FIG. 4 may correspond to variable states at a particular point in the computer code, that are tracked by static verification analysis component 310. Thus, execution path 410 includes nodes 412 and 414, and execution path 420 includes nodes 422 and 424. The computer code corresponding to the execution paths shown in FIG. 4 may include the following code:

$$y=x$$

$$y=-1*y,$$

where x and y are integers. Further, assume that the abstract interpretation is performed using the sign method, in which integers are approximated as having either a positive or negative value.

Node 412 of execution path 410 may correspond to the first line of code ($y=x$) and the variable state in which y is approximated as a positive value. Node 414 may correspond to the next line of code ($y=-1*y$) in execution path 410, in which the sign of the variable y is inverted to a negative. Similarly, node 422 of execution path 420 may correspond to the first line of code and the variable state in which y is approximated as a negative value. Node 424 may correspond to the next line of code in execution path 420, in which the sign of the variable y is inverted to a positive value.

In FIG. 4, assume that execution path 410 represents states that may occur during real execution of the computer code and execution path 420 represents states that are not reachable (i.e., will not actually occur) during real execution of the computer code. Execution path 420 may not occur, because, for example, prior statements in the computer code may act to confine variable x to positive values when the first line of the example code is reached. This fact may not be readily obtainable by static verification analysis component 310, however, and to thus ensure that all reachable states are included in the static verification, static verification analysis component 310 may over-approximate the states to include both execution paths 410 and 420 in the static verification analysis.

Referring back to FIG. 3, static verification analysis component 310 may determine whether points in the code are associated with an error. For example, static verification analysis component 310 may perform an analysis, using execution paths calculated through over-approximation of the abstract values, to determine which operations (i.e., code points) are free of run-time errors or to find possible errors. Errors that may be found include, for example: overflows and underflows; divisions by zero and other arithmetic errors; out-of-bounds array access; illegally dereferenced pointers; read access to non-initialized data; dangerous type conversions; dead code; access to null pointers; dynamic errors related to object programming and inheritance; errors related to exception handling; non-initialized class members in C++ language; and/or impossible entry point synchronization errors. Impossible entry point synchronization may refer to errors in the synchronization of two concurrent tasks.

As a result of the static analysis, static verification analysis component 310 may classify the code into classifications that relate to possible errors in the code. In one implementation, the classification may include classifying each possible failure point in the source code into classes that define, for example: code that has no errors, code that may possibly include errors (unknown or unproven conditions), code that definitely has errors, or code that cannot be reached. The classifications may be presented to the user in a number of possible ways, such as by changing the appearance of the code (e.g., font type, font size, font color, etc.) based on its classification. In one particular implementation, the code may be presented using color codes. For example, the code may be shown to the user as GREEN code (code that has no errors), RED code (code that definitely has errors in all possible dynamic execution paths), GRAY code (code that cannot be reached), or ORANGE code (unknown or unproven error conditions and/or a mix of situations that include GREEN code in some situations and RED code in others).

Static verification analysis component 310 may also return the execution path/state information for the static verification. For example, static verification analysis component 310 may store the state graphs associated with each of the determined execution paths, such as those shown in FIG. 4.

Back-propagation component 320 may traverse the execution paths determined by static verification analysis component 310, in a backwards direction (i.e., back-propagation) to determine causes of errors or possible errors found in the computer code by static verification component 310 (i.e., during the forward propagation through the execution paths, as performed by static verification analysis component 310). In general, back-propagation component 320 may perform the back-propagating beginning from states that correspond to errors or potential errors (e.g., orange code). The determined causes of the potential errors may be output to a user and/or saved. The operation of back-propagation component 320 will be described in more detail below.

Empiric component 330 may operate to provide additional information relating to the potential errors. The additional information may be used to assist in the classification of the potential errors. Empiric component 330 may generally operate on semantic information obtained from the computer code. The operation of empiric component 330 will be described in more detail below with reference to FIG. 10.

The potential error causes, when output, may be associated with an error category to assist the developer in understanding the error and determining whether the error needs to be fixed. For example, error causes may be categorized as: (1) "contextual," which may mean that the cause is inside of an analyzed section of code; (2) "robustness," which may mean that the cause is due to an input for the analyzed code (i.e., the cause comes from outside of the analyzed code); and (3) "robustness with data range specifications," which may mean that the cause is an input that has been defined, by the developer, to a range. For example, the developer may define that a variable is in a range of [−10, 10], but despite this range, the variable caused an error.

The categories assigned to the potential causes may be used by a developer in deciding which potential errors should be further investigated and/or how to prioritize the investigation of the potential errors. This information may thus be used by the developer in handling the "triage" of the potential errors.

Although FIG. 3 shows example of functional components of verification tool 105, in other implementations, verification tool 105 may contain fewer functional components, different functional components, differently arranged functional components, and/or additional functional components than those depicted in FIG. 3. Alternatively, or additionally, one or more functional components of verification tool 105 may perform one or more other tasks described as being performed by one or more other functional components of environment verification tool 105.

Figure 5:
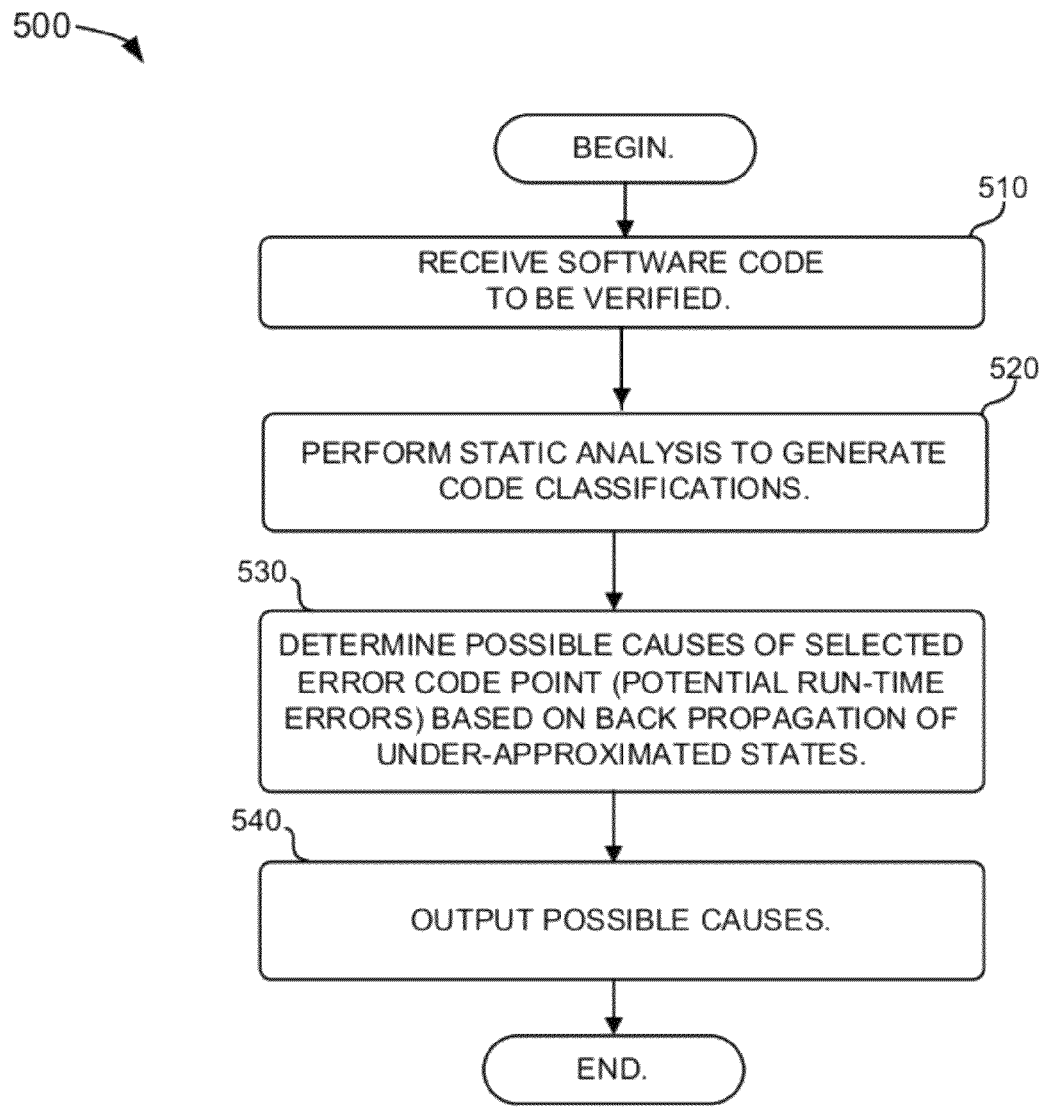
FIG. 5 is a flow chart illustrating an example process for determining causes of a software bug.

FIG. 5 is a flow chart illustrating an example process 500 for determining causes of software bugs. Process 500 may be performed by, for example, verification tool 105.

Process 500 may receive the software code that is to be verified (block 510). For example, a user at one of workstations 110 may use verification tool 105 to select one or more files that contain the software code that is to be verified. The software code may be textual source code, or code describing a graphical model created using a technical computing environment.

Process 500 may additionally include performing a static verification analysis to generate initial classifications for the code (block 520). As previously mentioned, static verification analysis component 310 may perform the static verification through abstract interpretation. Static verification analysis component 310 may generate the code classifications (e.g., RED, ORANGE, GREEN and GRAY code) and may store the state information for the execution paths through the code.

A user of verification tool 105 may browse the results of the code classifications. In one implementation, the software code may be displayed to the user in a graphical interface in which the text of the code may be color coded (e.g., RED, ORANGE, GREEN, or GRAY) to indicate its error classification. For example, each function or line of code may be colorized according to the most critical error found. In this manner, a user may easily view results of the static verification and potentially fix the errors that may be associated with the RED and ORANGE code (or, in some situations, GRAY code). Locating the underlying cause of an error can potentially be a non-trivial task for the user. Possible causes for the errors, located by the static analysis, may be determined (block 530). The possible causes may be determined based on back-propagation of under-approximated states in the execution paths (block 530). Additional details of block 530 will be described below.

The causes determined in block 530 may be output to the user (block 540). For example, code points that correspond to the causes may be annotated in the software code, such as by changing the font color; adding comment text to the software code; displaying a list of possible causes, where each item in the list is associated with a line number that references a code point; or other techniques for presenting the determined causes to the user. In one implementation, textual information describing why the particular code point was determined to be a cause may also be included.

In some implementations, the causes for the errors, as determined in block 530, may be automatically determined during the static verification analysis, for all of the errors determined in block 520. Select ones of the determined causes may then be output to the user upon request by the user. Alternatively, verification tool 105 may determine and output possible cause in response to a user explicitly selecting an error code point as one that is of interest.

Figure 6:
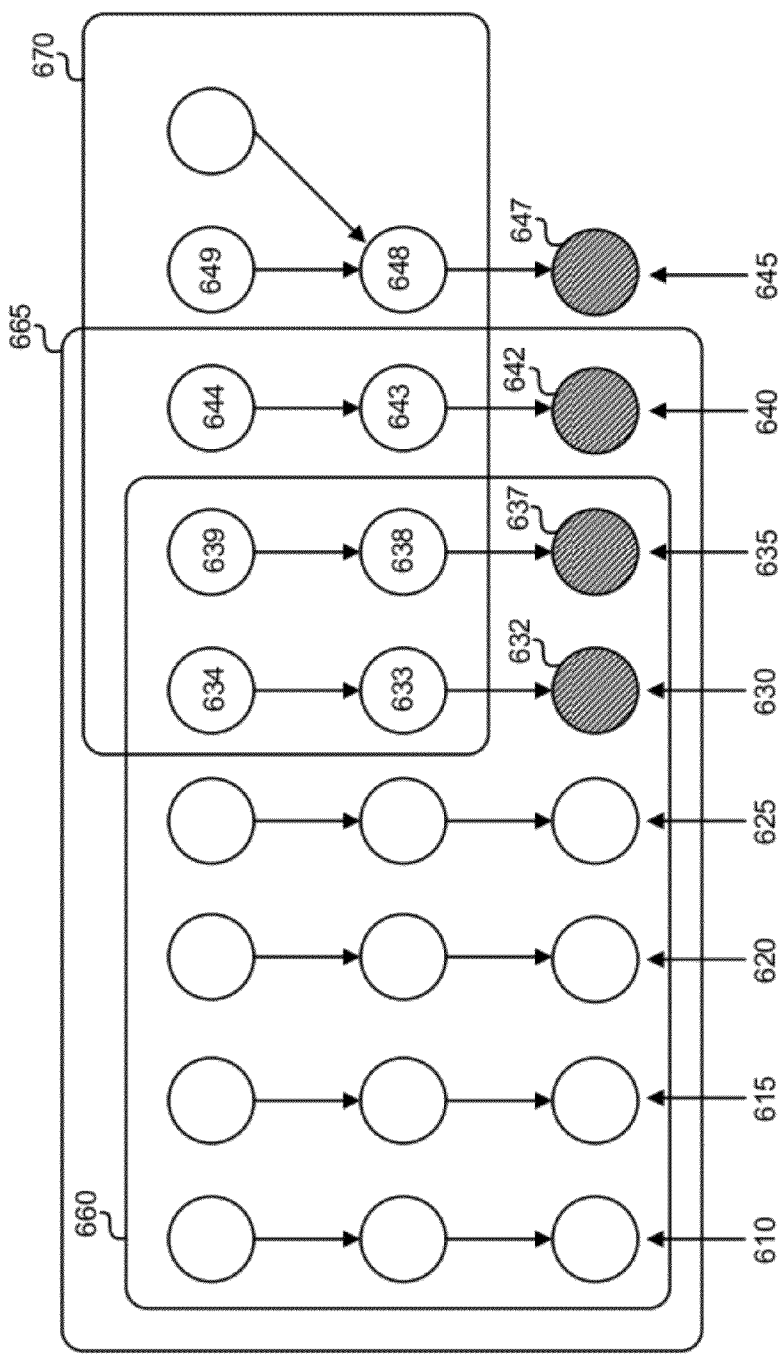
FIG. 6 is a diagram illustrating a number of execution paths for a hypothetical section of computer code.

FIG. 6 is a diagram illustrating a number of execution paths for a hypothetical section of computer code. As with the diagram of FIG. 4, each execution path is illustrated as one or one or more nodes (circles), where each node represents a state, which may refer to a code point and one or more abstractly represented variable values.

A number of execution paths, labeled as execution paths 610, 615, 620, 625, 630, 640, and 645, are shown in FIG. 6. Each execution path may represent a different set of variable states through the same computer code. As illustrated, each execution path may include a number of connected nodes. Assume that nodes 632, 637, 642, and 647 (shown with cross-hatching) correspond to an error or potential error condition. These nodes may correspond to a code point, that when executed with certain variable values, causes an error. For example, a particular variable that is used to index an array, for certain values of the variable and at a particular code point, may cause an out-of-bounds array access error. Nodes 632, 637, 642, and 647 may correspond to the error states for that particular variable and at the particular code point.

Assume that the nodes within box 660 correspond to accessible states. As used herein, an accessible state may be a state that may actually be reached during execution of the computer code. An accessible state may be referred to as a live state. Due to the complexity of the computer code, static verification analysis component 310 may not be able to precisely determine the accessible states and may instead estimate the accessible states, through over-approximation. The over-approximated set of accessible states is shown within box 665. The over-approximated accessible states may be a superset of the actual set of accessible sets. States outside of accessible states 660 (i.e., the states associated with execution paths 640 and 645) may be states that cannot be reached during execution of the computer code. These states may be referred to as dead states.

The nodes within box 670 (nodes 633, 634, 638, 639, 643, 644, 648, and 649) may be the states that are co-accessible from the error states (i.e., nodes 632, 637, 642, and 647). In other words, by back-propagating from the error states, the co-accessible states may be reached.

Figure 7:
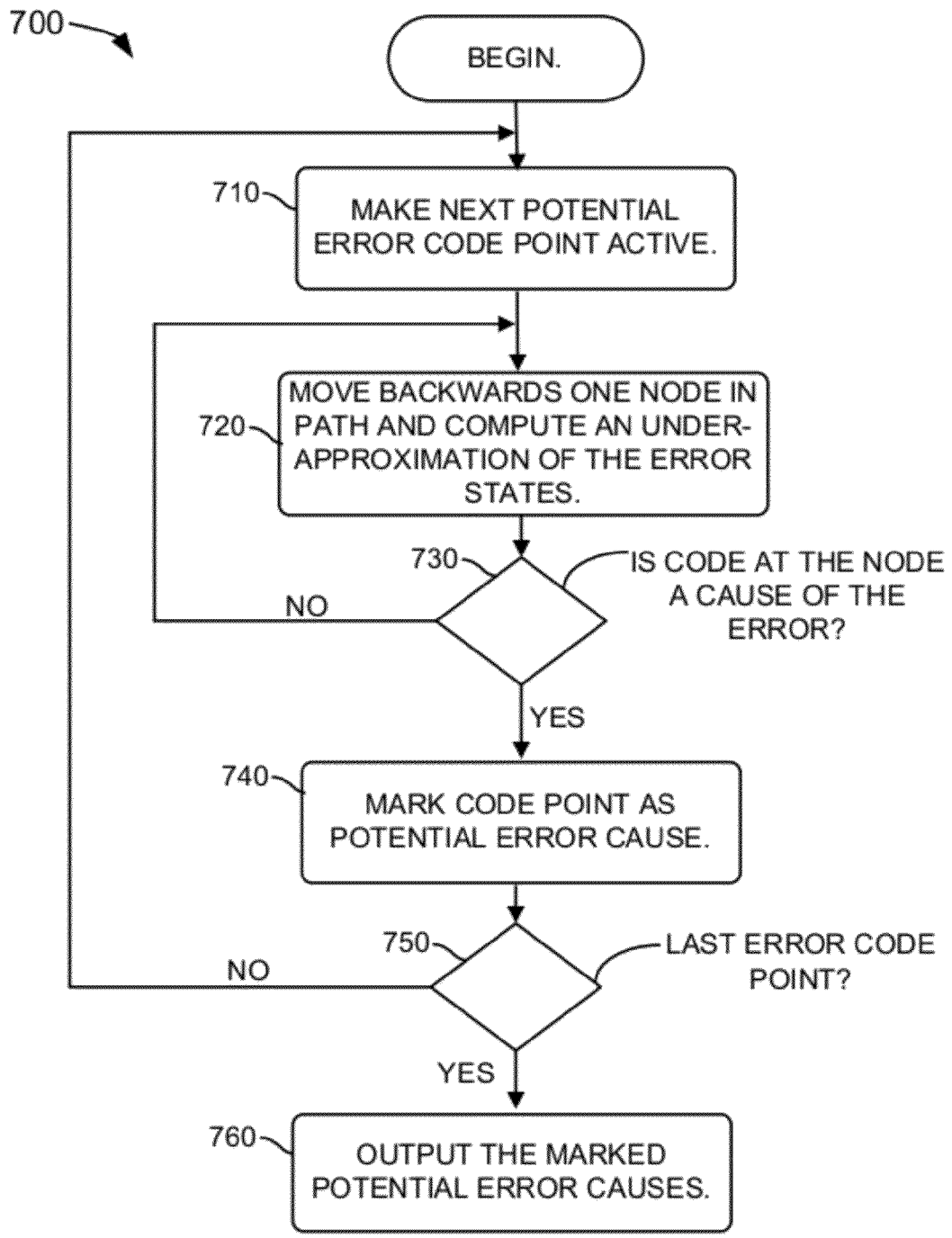
FIG. 7 is a flow chart illustrating an example process for determining possible causes of errors.

FIG. 7 is a flow chart illustrating an example process 700 for determining possible causes of error code points, as performed in block 540. Process 700 may be performed by, for example, back-propagation component 320.

Conceptually, process 700 may be performed for each execution path, as determined during the forward static analysis (i.e., in block 520), in which a state in the execution path is an error state that corresponds to the code point of the error selected by the user. For example, referring to FIG. 6, the bottom circle in each of execution paths 610-640 (execution path 645 is a hypothetical set of nodes that was not included in the over-approximated set of accessible states in box 665) may correspond to the code point selected by the user. Of these, nodes 632, 637, and 642 (corresponding to execution paths 630, 635, and 640) may be the error states (i.e., the states in which the approximated variable values cause an error).

Process 700 may include making the next code point that corresponds to an error state as the active code point (block 710). For each code point that is to be examined, and starting at the node in the execution path corresponding to the error state, back-propagation component 320 may back-propagate through the execution path, corresponding to the code point, by moving backwards one node through the graph defined by the execution path (block 720). In FIG. 6, for example, starting at node 632, back-propagation component 320 may next examine node 633 as the active node. Back-propagation component 320, at each node, may compute an under-approximation of the error states.

The term under-approximation, as used herein, may refer to an abstract approximation of states in which a conservative approximation is performed to ensure, with a high level of confidence, that all of the under-approximated states are co-accessible from the error state. In some implementations, back-propagation component 320, when under-approximating variable state values, may determine, with less than full confidence, that some states are co-accessible from the error state. In this situation, when outputting the cause of the error state to the user, the potential cause may be output with warning text to explain the uncertainty in the co-accessibility. Additionally, the under-approximation may be performed such that the under-approximation of the variable values makes the selected code point fail. Under-approximation will be described with reference to FIGS. 8A and 8B.

Figure 8A:
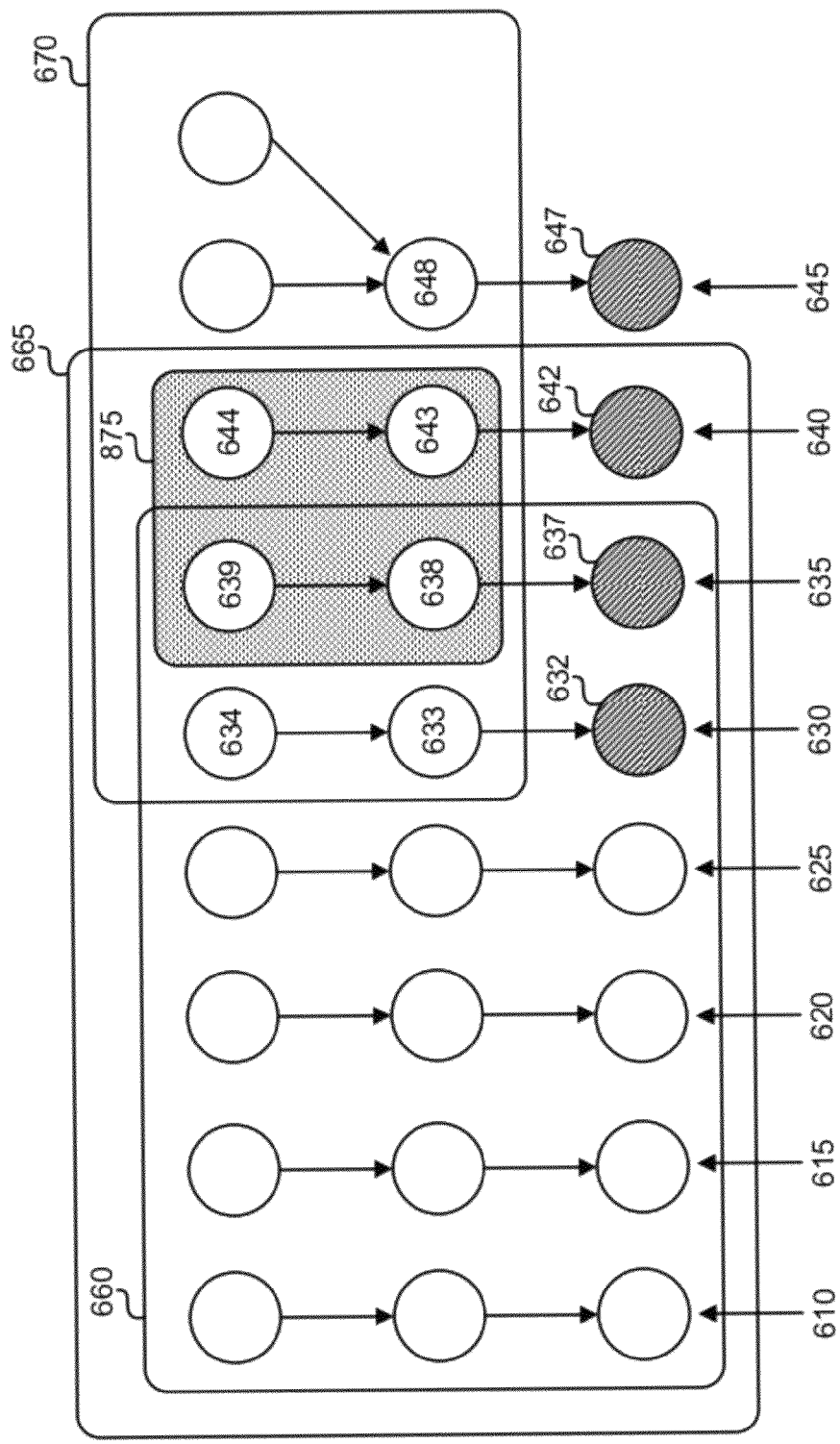
FIGS. 8A and 8B are diagrams illustrating the under-approximation.

FIG. 8A is a diagram illustrating the execution paths shown in FIG. 6. Additionally, in FIG. 8A, however, nodes corresponding to states that are an under-approximation of states that are co-accessible from the error states are illustrated within shaded box 875. As shown, nodes corresponding to under-approximated states include nodes 638, 639, 643, and 644. In this example, nodes 633 and 634 are nodes that lead to an error state (node 632) in the accessible set of nodes (box 660), but were not included in the under-approximated states by back-propagation component 320. Further, in this example, nodes 643 and 644 are nodes that lead to an error state (node 642) that is not in the accessible set of nodes (box 660) but is only in the over-approximated set of accessible nodes (box 665). By under-approximating the states that are co-accessible from the error states, back-propagation component 320 may limit the number of false positive causes that may be found for the error state. In particular, through under-approximation, back-propagation component 320 may eliminate false positive causes in which approximated state values do not actually lead to error conditions during real execution. In some situations, however, false positive causes may still be located in the sense that the located cause may be within dead code in which there is no execution path, during real execution, that may lead to the error.

Figure 8B:
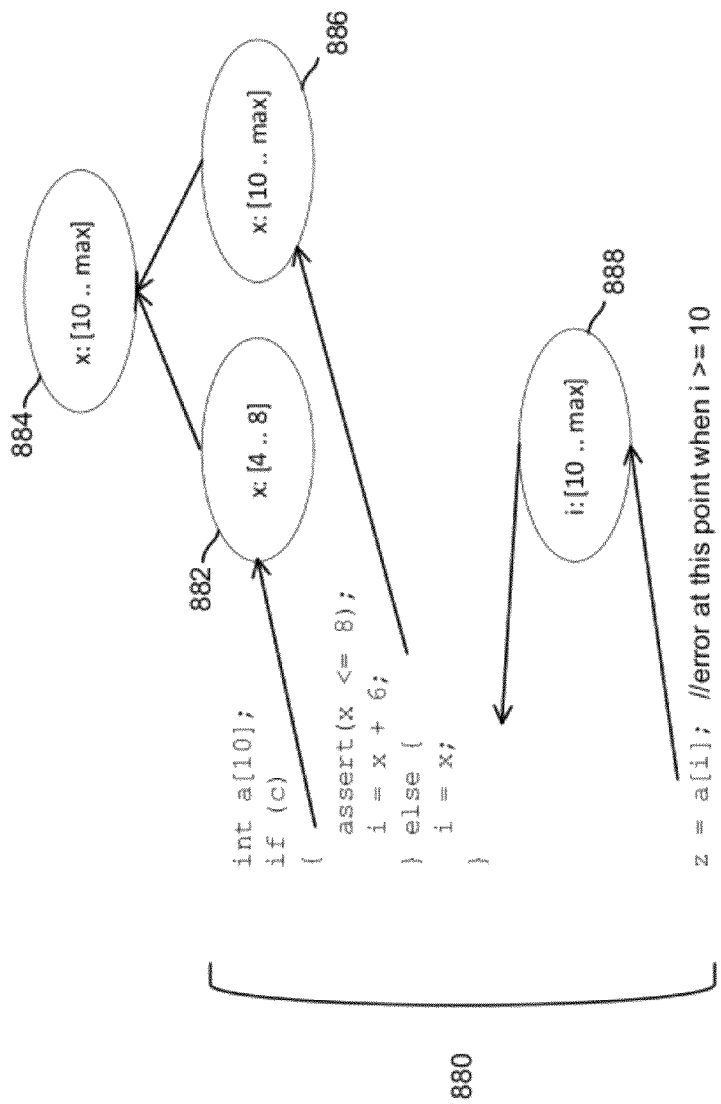

FIG. 8B is a diagram of computer code used to illustrate the concept of under-approximation during a backward propagation of values. As shown, assume that the variables i and x are to be under-approximated for code 880. Various potential approximations for a possible range of values for x and i are shown in bubbles 882, 884, 886, and 888. During a backward propagation, starting at the last line in code 880, i may be approximated as the range [10 . . . max] (bubble 888). Because the array a is declared as having a size of ten, this range for i corresponds to the values of i that cause an array Out of Bounds error. Within the if statement, at the point in code 880 corresponding to bubble 882, x may be approximated as being in the range [4 . . . 8] and at the point in code 880 corresponding to bubble 886, x may be approximated as being in the range [10 . . . max], where max is the maximum value for x. Bubbles 882 and 886 correspond to alternative branches in the if statement in code 880. Continuing with the back-propagation, x may be approximated, in bubble 884, which may correspond to the value of x before entering code 880, as in the range [10 . . . max]. In bubble 884, the range for x is an under-approximation in which the state corresponding to bubble 882 is dropped. Thus, the under-approximation may operate to drop states rather than add false states. Referring back to FIG. 7, back-propagation component 320 may determine whether the node should be considered a cause of the error (block 730). In one implementation, back-propagation component 320 may determine a node as a cause of the error if the code corresponding to the node includes a variable input, variable assignment, variable declaration, or function return value, in which the input, assignment, declaration, or function return value impacts one or more variables that results in the occurrence of the error condition. Other techniques for determining whether a node should be considered to be a possible cause of the error condition may alternatively be used. In general, a node that modifies variables that may lead to the error condition and is determined to be of interest to a user, may be considered as a possible cause of the error condition.

If the node is not determined to be a potential cause of the error condition, (block 730—NO), block 720 may be repeated to evaluate the next node in the back-propagation path. When, however, the node is determined to be a potential cause of the error condition, (block 730—YES), the code point corresponding to the node may be marked as a potential cause of the error condition (block 740).

Process 700 may further include, when there are no more error code points (block 750—YES), outputting the marked potential error causes (block 770). In one implementation, the marked potential error causes may be additionally examined or filtered before being output. For example, the potential error causes may be ranked based on the likelihood of the cause being a true cause of the error, and only a limited number of the causes may be output.

Referring back to FIG. 8A, for the four illustrated execution paths that include the error state (execution paths 630, 635, 640, and 645), only execution paths 630, 635, and 640 may be included in the over-approximation of accessible states. Of these, execution paths 635 and 640 include states that are an under-approximation of the states that are co-accessible with the error condition. Accordingly, assuming nodes 639 and 644 represent the determined causes of the error condition, process 700 may return nodes 639 and 640 as the possible causes. Of these, node 639 (execution path 635) is a true accessible state while node 644 (execution path 640) is outside of the accessible states and may not be reachable in an actual execution of the computer code.

FIG. 9 is a diagram illustrating an example of a graphical interface 900 in which computer code is shown that may be analyzed by software verification tool 105. The computer code includes a function ƒ 905 that calls a function get_index 910. In dynamic execution, ƒ 905 calls get_index 910 with a value in the argument count. Based on count, get_index 1010 returns either an index of an element from the array named array (line 3) or the value 5 if the loop (lines 10-12) in get_index 910 examines all values of array without finding one that satisfies the condition in the loop. The result of get_index 910 is used as an index into another array, array2 (line 24). If ƒ 905 is called with a value <=400, the return statement at line 11 is never taken but the return statement at line 14 is taken and the instruction at line 24 causes an array out of bounds error. Line 14 is, thus, the contextual cause of the potential error that may occur at line 24.

Static verification analysis component 310 may mark line 24 as ORANGE code that, for certain state values, will cause an array out of bounds error. In this example, the marked code is shown as a pop-up bubble 920. A user that would like to investigate the cause of the error may choose to check this line. The user may, for example, right-click on bubble 920 and select a "show bug" option from a contextual menu. In response, back-propagation component 320 may show the cause, which may be determined or be previously determined by back-propagating, from line 24, for execution paths that cause the error. In this case, because a value of index that is less than 0 or greater than or equal to 5 causes the error, the execution paths in which index includes these values may be the error states considered by back-propagation component 320. In this case, assume that the values of index less than zero are determined by back propagation component 320 to be inaccessible states, even with over-approximation, as index can never have these values. Additionally, during forward propagation, at line 14, index will have been determined to be equal to 5. Through back-propagation, it may be determined that a value of 5 or greater, for index, at line 14, causes an error, Back-propagation component 320 may display a visual indicator, such as pop-up bubble 930, informing the user that line 14 may be the cause of the error.

As described above, potential causes of errors in computer code can be determined by, starting from an over-approximated set of error states, back-propagating through an under-approximation of states that are co-accessible to the error states. Advantageously, due to the under-approximation during back-propagation, false positives for the potential error states may be reduced. Additionally, as the over-approximated set of error states may be performed and saved as part of an initial state verification analysis, the computing resources needed to find the causes may be reduced because, for instance, non-error code points (e.g., GREEN code) does not need to be considered when searching for the cause of these code points.

As previously mentioned, the potential error causes, when output, may be associated with an error category to assist the developer in understanding the error and determining whether the error needs to be fixed. The error causes may be categorized as contextual, robustness, or robustness with data range specifications.

When classifying the error causes as contextual or robustness, results obtained through backward propagation of under-approximated values (as performed by back-propagation component 320) and results obtained through empiric techniques (as performed by empiric component 330) may be used. Results obtained through other techniques may also be used, such as automatic orange testing (AOT) and trace partitioning. AOT may include using the results of a forward static analysis of computer code to instrument the computer code for dynamic testing of the computer code. AOT techniques may generate cause information that is completely sure (i.e., no false positives) but may fail to cover all potential real execution paths of the computer code.

Trace partitioning may refer to forward propagation, such as performed by static verification analysis component 310, in which multiple environments are maintained. Because forward propagation experiences no particular difficulties with binary operations or loops, trace partitioning may be useful for providing information relating to errors in these situations. Trace partitioning may not, however, be useful to determine the cause of an error.

The operation of empiric component 330 will next be described. Empiric techniques may generally operate to examine variable state values around the determined ORANGE error checks and select the check if the variable values are within a reasonable range. In other words, if the determined variable values are within a reasonable range, as may be determined empirically by software verification tool 105, software verification tool 105 may mark the error for the user as one in which the bug may be relatively easy to isolate because software verification tool 105 can provide useful information to the developer, such as the range of variable values. If, however, software verification tool 105 determines that the variable range is not reasonable, such as what may happen if software verification tool 105 is not able to determine anything about the variable state (i.e., the variable value may exist over its entire value range), the empiric techniques may not generate any useful information for the error. The empiric techniques may operate locally to the errors and accordingly, the notions of cause or likeliness may not be applicable to the empiric techniques.

Figure 10:
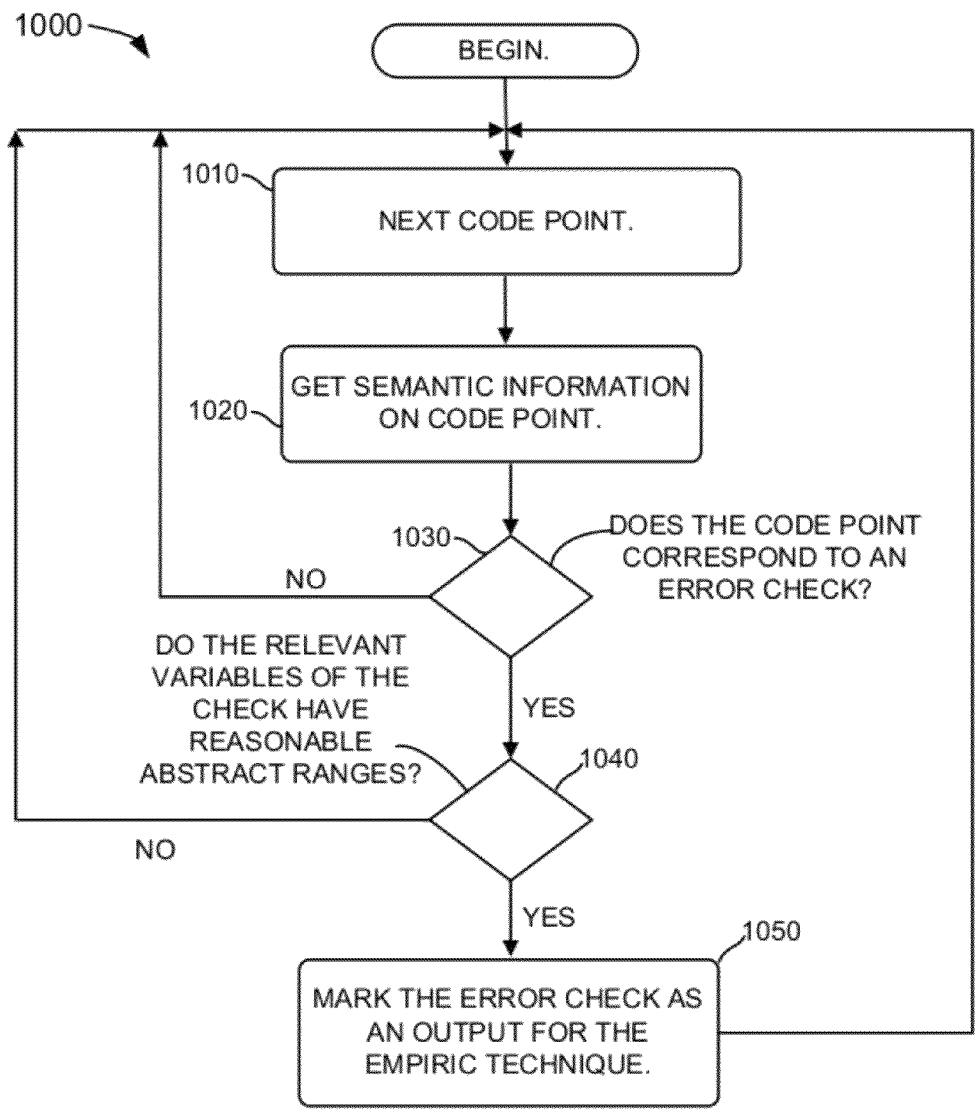
FIG. 10 is a flow chart illustrating an example process for performing the empiric technique.

FIG. 10 is a flow chart illustrating an example process 1000 for performing the empiric technique. Process 1000 may be performed by empiric component 330 of software verification tool 105.

Process 1000 may include, for a particular section of software code that is being analyzed, selecting the next code point in the code as the active code point (block 1010). The next code point may be, for example, the next point obtained through a forward propagation of the software code. Semantic information about the code point may be obtained (block 1020). The semantic information may include information relating to the structure of the code. From the state information, process 1000 may include determining whether the code point corresponds to an error check point (block 1030).

As an example of blocks 1030 and 1040, consider the following example C code:

```
int a[5];
N = something_full_range // (i.e., no knowledge of it)
for (i = 0; i <= N; i++)
    a[i] = i;
```

Here, the developer may not want an Array Out of Bounds check (on a[i]) to be given as a possible error. This error is likely a false positive that is due only to the approximation inside of static verification analysis component 310.

Next, consider the following example C code:

```
int a[5];
N = 5;
for (i = 0; i <= N; i++)
    a[i] = i;
```

Here, an Array Out of Bounds error check may be issued when N=5. This is likely a developer bug (i<=N went one iteration too far). The above two code examples demonstrate the importance of the semantic information used by the empiric technique. In each example, the information relating to the usage of the variable i is the same. The bounds of the for loop, however, determine whether to mark the potential error as an error. The empiric technique may examine the semantics (in this case, the meaning of the code relating to the bounds of the loop) and select the check if the semantics indicate that i is not within the full range.

Process 1000 may further include determining, when the code point corresponds to an error check point, whether the variables corresponding to the check have reasonable abstract ranges (block 1040). The abstract range of a particular variable may be determined through forward propagation by static verification analysis component 310. Whether a particular variable range is reasonable may be determined by, for example, predetermined ranges set for different variable types, empirical observations of variable ranges, observations based on industrial experience, or combinations of these techniques.

When a variable range is determined to be reasonable (block 1040—YES), empiric component 330 may mark the corresponding code point as an output (block 1050). At this point, the code point is determined to potentially be an error and the range of the relevant variables states are limited to a reasonable range. Accordingly, it may be useful to further examine or to output the error to the developer for further examination, as the further examination may be able to determine the cause of the error.

When the variable range is determined to not be reasonable (i.e., the range is too large) (block 1040—NO) or the code point does not correspond to an error (block 1030—NO), the next code point in the code being examined may be set as the active code point (block 1010).

Figure 11:
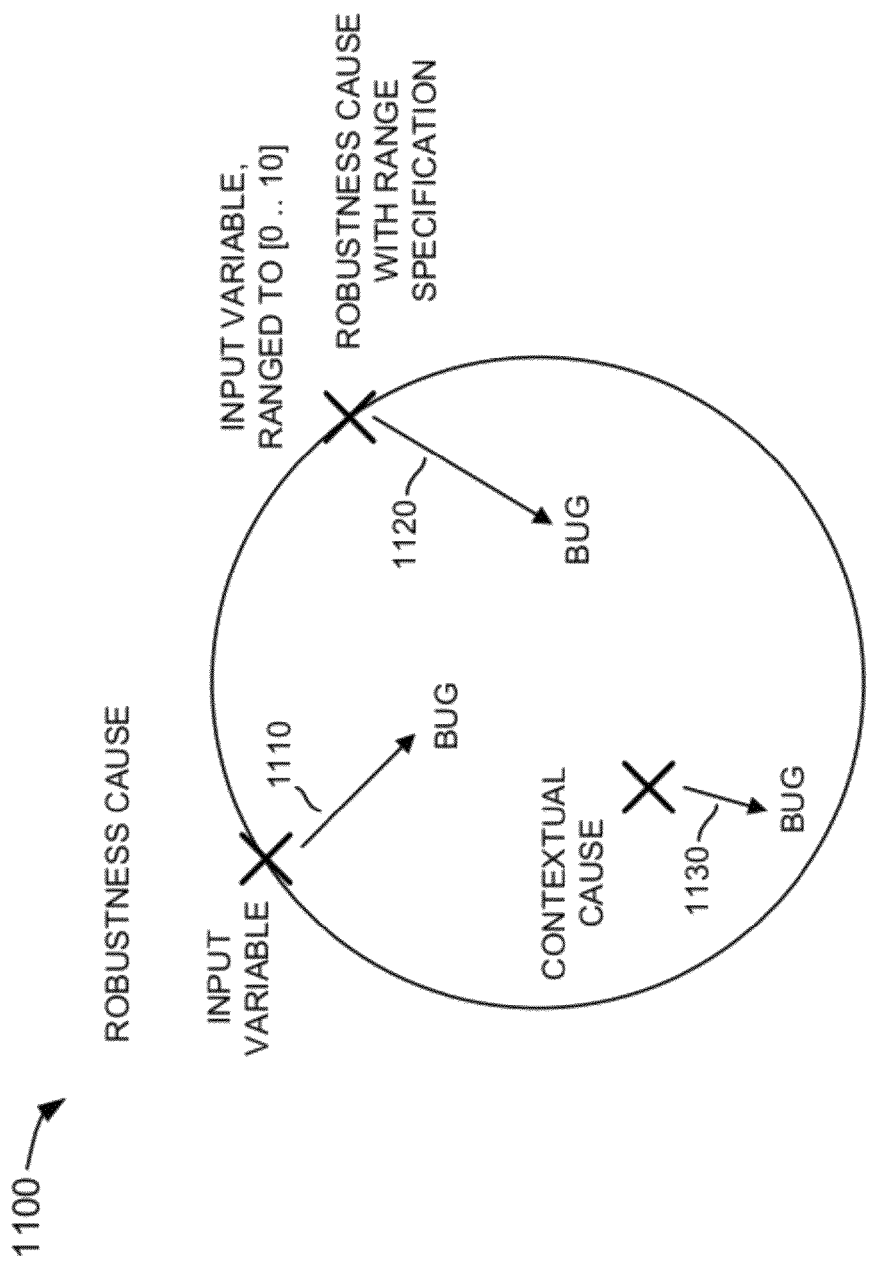
FIG. 11 is a diagram conceptually illustrating categories of determined error causes.

FIG. 11 is a diagram conceptually illustrating the "contextual" and "robustness" categories discussed previously. In FIG. 11, circle 1100 may represent the code that is being examined by software verification tool 105. Assume that the Xs in FIG. 11 represent the code location of the causes of errors. The arrows in FIG. 11 may represent the fact that there exists a path from a cause of an error to the error location. For arrows 1110 and 1120, the detected cause is illustrated as being on the boundary of the code, which may indicate a robustness cause. For the abstraction of arrow 1130, the detected cause is illustrated as being within circle 1100, which may indicate a contextual cause.

Consistent with aspects described herein, whether an error check is categorized as contextual or robustness may be based on a combination of input information from, for example, back-propagating through an under-approximation of states, AOT, the empiric technique, and/or trace partitioning. In one implementation, the impact of input values, as determined by forward propagation, may additionally be used in combination with these techniques to perform classifications between contextual and robustness. For instance, if an error check is marked by the empiric technique (e.g., FIG. 10, block 1050), and the error check is impacted by input values, then the error check may be classified as robustness and otherwise it may be classified as contextual.

In some implementations, a second classification can additionally be performed on an error check point, such as an ORANGE check, to potentially determine the likeliness of the error check point being a bug. The second classification can be performed differently depending on the technique that marked the error check point. If AOT marks the check point, the likeliness of there being a bug may be 100%, while backward propagation through under-approximation and the empiric technique may have a less than 100% likeliness. In some situations, if a potential error check point is marked by multiple techniques, the likeliness of the check point corresponding to an actual bug may be increased.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 5, 7, and 10, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

The term component, as used herein, is intended to be broadly construed to include hardware (e.g., a processor, a microprocessor, an ASIC, a FPGA, a chip, a memory device (e.g., a ROM, a RAM, etc.), etc.) or a combination of hardware and software (e.g., a processor, microprocessor, ASIC, etc. executing software contained in a memory device).

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving computer code,
      the receiving being performed by a device;
   performing a static verification analysis of the computer code to locate a point in the code that, under at least one set of states of variables in the computer code, causes an error in an execution of the computer code, the static analysis being performed by analyzing a first plurality of possible execution paths of the computer code based on an over-approximation of states, and the performing is being performed by the device;

back-propagating, from the located point, through a second plurality of possible execution paths, the second plurality of possible execution paths being obtained based on an under-approximation of the states that were over-approximated, and the back-propagating being performed by the device;

determining, based on the back-propagating, a second point in the computer code as a potential cause of the error, the determining being performed by the device;

analyzing, using empiric techniques and based on semantic information for the computer code, the computer code to determine a category for the potential cause of the error, the analyzing the computer code being performed by the device, and the category comprising one of:

a first category when the cause of the error is determined to be within the computer code, or a second category when the cause of the error is determined to be due to an input to the computer code; and storing output information associated with the second point in the computer code, the storing being performed by the device.

2. The method of claim 1, where the static verification is performed through an abstract interpretation of variable states in the computer code.

3. The method of claim 1, where determining the second point in the computer code further includes:

determining the second point as a point, in the computer code, that includes an input, a variable assignment, a variable declaration, or a function return value.

4. The method of claim 1, where the over-approximation of the states includes approximating possible variable states, where at least one of the approximated possible variable states includes states that are not reached during a dynamic execution of the computer code.

5. The method of claim 1, where the under-approximation of the states includes approximating possible variable states, during the back-propagating.

6. The method of claim 1, where performing the static verification analysis includes:

detecting one or more of:

one or more errors relating to one or more overflows,
one or more errors relating to one or more underflows,
a division by zero,
an out-of-bounds array access,
one or more illegally de-referenced pointers,
a read access to non-initialized data,
one or more dangerous type conversions,
one or more exceptions,
dead code,
access to a null pointer, or
one or more impossible entry point synchronization errors.

7. The method of claim 1, where the under-approximated states includes states that are co-accessible from a set of states corresponding to the error.

8. The method of claim 1, where the computer code corresponds to code generated based on a model created in a technical computing environment.

9. The method of claim 1, further comprising:

outputting information indicating a likelihood that the located point causes an error, the likelihood being determined based on one or more outputs of the back-propagating and the empiric techniques.

10. A non-transitory computer-readable medium storing instructions, the instructions comprising:

one or more instructions that, when executed by one or more devices, cause the one or more devices to:

obtain computer code;

perform a static verification analysis of the computer code to identify a point, in the computer code, that, under at least one set of states of variables in the computer code, causes an, the static verification analysis being performed by analyzing a first plurality of possible execution paths of the computer code based on an over-approximation of;

back-propagate, from the identified point, through a second plurality of possible execution paths, the second plurality of possible execution paths being determined based on an under-approximation of the states;

identify, based on back-propagating through the second plurality of possible execution paths, a second point, in the computer code, as a potential cause of the error;

determine a category associated with the second point based on analyzing the identified point using an empiric analysis technique based on semantic information for the computer code, the category corresponding to a first category when the error is caused by code included in the computer code, and the category corresponding to a second category when the error is caused by an input to the computer code, and output information identifying the category and information associated with the second point.

11. The non-transitory computer-readable medium of claim 10, where the first plurality of possible execution paths includes a plurality of ordered states, where each state, of the plurality of ordered states, is defined by:

a particular point in the computer code, and
representations of variable values corresponding to the particular point in the computer code.

12. The non-transitory computer-readable medium of claim 10, where the second point is associated with one or more of:

an input,
a variable assignment,
a variable declaration, or
a function return value.

13. The non-transitory computer-readable medium of claim 10, where the over-approximation of the states includes approximating possible variable states, where at least one of the approximated possible variable states include a state that is not reached during a dynamic execution of the computer code.

14. The non-transitory computer-readable medium of claim 10, where the under-approximation of the states includes approximating possible.

15. The non-transitory computer-readable medium of claim 10, where the instructions further comprise:

one or more instructions that, when executed by the one or more devices, cause the one or more devices to:

detect, based on the static verification analysis one or more of:
an error relating to an overflow,
an error relating to an underflow,
a division by zero,
an out-of-bounds array access,
an illegally de-referenced pointer,
a read access to non-initialized data,
a dangerous type conversion,
one or more exceptions,
dead code,
access to a null pointer, or
an impossible entry point synchronization error.

16. The non-transitory computer-readable medium of claim 10, where the computer code corresponds to code generated based on a model created in a technical computing environment.

17. A device comprising:
one or more processors to:
perform a static verification analysis of computer code to identify a point, in the computer code, that, under at least one set of states of variables in the computer code, causes an error in an execution of the computer code,
when performing the static verification analysis, the one or more processors being to:
analyze a first plurality of possible execution paths of the computer code based on an over-approximation of states,
traverse, from the identified point, through a second plurality of possible execution paths of the computer code in a backward direction,
the second plurality of possible execution paths being determined based on an under-approximation of the states,
analyze the identified point using an empiric analysis technique based on semantic information for the computer code,
determine, based on traversing through the second plurality of possible execution paths in the backward direction, one or more points in the computer code as possible causes of the error,
classify, based on traversing through the second plurality of possible execution paths in the backward direction and the analyzing the identified point, the one or more points as one of:
a first error classification, when the error is caused by code included in the computer code, or
a second error classification, when the error is caused by an input to the computer code, and
output information associated with classifying the one or more points.

18. The device of claim 17, where the first plurality of possible execution paths include a plurality of ordered states, where each state, of the plurality of ordered states, is defined by:
a particular point in the computer code, and
one or more representations of variable values corresponding to the particular point in the computer code.

19. The device of claim 17, where the one or more points include one or more of:
a point in the computer code associated with an input,
a point in the computer code associated with a variable assignment,
a point in the computer code associated with a variable declaration, or
a point in the computer code associated with a function return value.

20. The device of claim 17, where the over-approximation of the states includes approximating possible variable states, where at least some of the approximated possible variable states include states that are not reached during a dynamic execution of the computer code.

21. The device of claim 17, where the under-approximation of the states includes approximating possible variable states, during traversing through the second plurality of possible execution paths in the backward direction,
where all of the one or more points are co-accessible from the identified point.

22. A device-implemented method, comprising:
receiving computer code,
the receiving being performed by the device;
performing a static verification analysis of the computer code to locate a point, in the computer code, that, under at least one set of states of variables in the computer code, causes an error in an execution of the computer code,
the static verification analysis being performed by analyzing a first plurality of possible execution paths of the computer code,
the first plurality of possible execution paths being determined based on an over-approximation of states, and
the performing being performed by the device;
traversing, from the located point and in a backward direction, through a second plurality of possible execution paths,
the second plurality of possible execution paths being determined based on an under-approximation of the states that were over-approximated, and
the traversing being performed by the device;
analyzing the located point using an empiric analysis technique based on semantic information for the computer code,
the analyzing the located point being performed by the device;
determining, based on the traversing, a second point in the computer code as a potential cause of the error,
the determining being performed by the device;
classifying, based on the traversing and the analyzing the located point, the second point as a first error classification, when the error is caused by code of the received computer code, or a second error classification, when the error is caused by an input to the computer code,
the classifying being performed by the device; and
storing information identifying the classification and information that describes the second point in the computer code,
the storing being performed by the device.

23. The device-implemented method of claim 22, where the static verification is performed through an abstract interpretation of variable states in the computer code.

24. The device-implemented method of claim 22, where determining the second point in the computer code includes:
determining the second point as a point, in the computer code, that includes an input, a variable assignment, a variable declaration, or a function return value.

25. The device-implemented method of claim 22, where the under-approximated states includes states that are co-accessible from a set of states corresponding to the error.

26. A non-transitory computer-readable medium storing instructions, the instructions comprising:

one or more instructions that, when executed by one or more processors, cause the one or more processors to:
perform a static verification analysis of computer code to identify a point, in the computer code, that, under at least one set of states of variables in the computer code, causes an error condition,
the static verification analysis being performed by analyzing a plurality of possible execution paths of the computer code based on an under-approximation of possible states;
back-propagate, from the identified point, through the plurality of possible execution paths;
identify, based on back-propagating through the plurality of possible execution paths, a second point, in the computer code, as a potential cause of the error;
determine a category associated with the second point based on analyzing the identified point using an empiric analysis technique based on semantic information for the computer code,
the category corresponding to a first category when the error is caused by code included in the computer code, and
the category corresponding to a second category when the error is caused by an input to the computer code, and
output information identifying the category and information associated with the second point.

* * * * *